Patented Nov. 13, 1928.

1,691,573

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

PROCESS OF MAKING DIPOLYMER.

No Drawing.    Application filed July 20, 1926.   Serial No. 123,812.

The object of my invention is to produce Dipolymer.

Dipolymer, as the term is herein employed, is a product, consisting of polymerized terpene hydrocarbons, which is obtained by polymerizing dipentene, turpentine or pine oil. Although it is largely composed of the Dipolymer $(C_{10}H_{16})_2$, substantial proportions of higher polymers, $(C_{10}H_{16})_n$, are generally present. Dipentene, as the term is herein employed, refers to the cut of pine products boiling largely between 165 and 185° C., which is obtained in the steam distillation of pine wood. Pure dipentene boils at 174–6° C., but the term dipentene as herein used is intended to comprehend the crude product with the wider boiling range.

It is known to make Dipolymer in the liquid phase by treating turpentine or dipentene with sulfuric acid of various concentrations. I have discovered that it may be prepared, by a simple and economical new process, from pine oil. I have discovered that it may be made either in the liquid phase or the vapor phase—in the former case by treatment with fuller's earth, or an equivalent polymerizing agent, and in the latter case by a somewhat different process in which the use of fuller's earth or equivalent polymerizing agent is desirable, but not indispensable, and functions as a catalyst.

In the case of pine oil, which consists largely of tertiary terpene alcohols, the fuller's earth causes two reactions: (1) dehydration of the pine oil to dipentene and other hydrocarbons, as

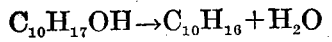

and (2) a polymerization of the hydrocarbons to the Dipolymer plus a smaller proportion of the higher polymers, as:

Pine oil may be heated with almost any proportion of fuller's earth and largely converted into Dipolymer. The degree of conversion depends upon the proportion of fuller's earth, the activity of the fuller's earth, the temperature used and the time of heating. Below 130° C. the rate of dehydration of pine oil is slow, but at temperatures about 145–225° C. the conversion to dipentene and subsequent polymerization is fairly rapid. The time required may be shortened by heating under pressure, but at temperatures above 250° C. a depolymerization is noticeable. It is usually of advantage to allow the water formed during the process to distill off during the operation. The earth may be re-used.

For example, 400 parts of pine oil are heated with 100 parts of fuller's earth in a bath held at 160–170° C. for eight hours. After cooling, the product is filtered from the fuller's earth and then distilled, 125 parts distilling below 250° C. The residue is Dipolymer. A portion of the lower boiling fraction can be converted into Dipolymer by again treating it with fuller's earth, but a large proportion of non-polymerizable hydrocarbons, including para-cymene, is present. The bath may be held at higher temperatures in order to decrease the period of heating. The pine oil may be refluxed with the fuller's earth.

Other clays, or silicious or argillaceous earths, such as filtrol, heated oxides, such as aluminum oxide, metallic chlorides, preferably anhydrous, such as zinc chloride, stannic chloride, aluminum chloride, and ferric chloride, as well as other polymerizing agents, may be substituted for fuller's earth; or mineral earth may be impregnated with an anhydrous metallic chloride or oxide in order to effect polymerization at a lower temperature.

The crude product which is obtained on polymerizing pine oil may be employed, in some instances, without refining; but it is usually preferably to distill off the lower boiling end, cutting around 250° C. By this procedure, the hydrocarbons and any unaltered pine oil are separated, leaving a residue consisting of crude Dipolymer.

Polymerization in the vapor phase may be carried out at temperatures ranging from 200–550° C. by passing the vapors of pine oil through a tube of iron or other suitable material at such a rate as will permit the vapors to remain in contact with a catalyst, contained in the tube, long enough to cause a partial polymerization. Heat alone will cause polymerization, but a catalyst, such as fuller's earth, is desirable. For example, through an iron tube 28" x 1", heated to around 475° C., filled with 8–10 mesh fuller's earth, is passed 200 cc. of pine oil at a rate of 50 cc. per hour. There were obtained 166 cc. of a product containing 44 cc. of Dipolymer. A portion of the unpolymerized oil was polymerized by re-passing through the tube.

A typical sample of crude Dipolymer has a specific gravity of 0.95, and the following boiling range: 5% over at 305° C., 20% at 326° C., 50% at 335° C., 70" at 342° C. and 90% at 375° C. If a cut is made when approximately 80% has distilled over, a product is obtained having a specific gravity of 0.94. A second cut may be made comprising approximately the 80–95% portion of the crude Dipolymer. This cut is exceedingly viscous and resembles a soft rosin. The residue is hard and brittle and has the appearance of a dark colored rosin. For some applications of the Dipolymer it may be desirable to separate it into cuts as outlined above.

I do not herein claim the above described preparation of Dipolymer in the liquid phase, the same forming the subject-matter of a separate application.

Having now fully described my invention, what I claim and desire to protect by Letters Patent is:

1. The process of preparing Dipolymer from pine oil which includes heating pine oil to a temperature in excess of 200° C. and below a temperature of 550° C. for a sufficient length of time to effect dehydration and finally polymerization of a substantial part of the pine oil vapors to form "Dipolymer."

2. The process of preparing Dipolymer from pine oil which includes vaporizing pine oil and passing the vapors in intimate contact with a catalyst for such length of time and at such temperature as will effect dehydration and finally polymerization of a substantial part of the pine oil vapors to form "Dipolymer."

3. The process of preparing Dipolymer from pine oil which includes vaporizing pine oil and passing the vapors through a permeable catalyst for such length of time and at such temperature as will effect dehydration and finally polymerization of a substantial part of the pine oil vapors to form "Dipolymer."

4. The process of preparing Dipolymer from pine oil which includes passing the vapors of pine oil, while at a temperature above 200° C. and below 550° C., in intimate contact with a catalyst for such length of time as will effect dehydration and finally polymerization of a substantial part of the pine oil vapors to form "Dipolymer."

5. The process of preparing Dipolymer from pine oil which includes heating pine oil to a temperature in excess of 200° C. and below a temperature of 550° C. for a sufficient length of time to effect dehydration and finally polymerization of a substantial part of the pine oil vapors, condensing the product, and reheating to a temperature required to vaporize the lower boiling fractions of the same, leaving a residue which comprises principally Dipolymer.

6. The process of preparing Dipolymer from pine oil which includes passing the vapors of pine oil, while at a temperature above 200° C. and below 550° C., in intimate contact with a cataylst for such length of time as will effect dehydration and finally polymerization of a substantial part of the pine oil vapors, condensing the product, and reheating to a temperature required to vaporize the lower boiling fractions of the same, leaving a residue which comprises principally Dipolymer.

7. The process of preparing Dipolymer from pine oil which includes heating pine oil to a temperature in excess of 200° C. and below a temperature of 550° C. for a sufficient length of time to effect dehydration and finally polymerization of a substantial part of the pine oil vapors, condensing the product, and fractionally distilling the same at temperatures adapted to yield products having specific gravities progressively lower than .96.

8. The process of preparing Dipolymer from pine oil which includes passing the vapors of pine oil, while at a temperature above 200° C. and below 550° C., in intimate contact with a catalyst for such length of time as will effect dehydration and finally polymerization of a substantial part of the pine oil vapors, condensing the product, and fractionally distilling the same at temperatures adapted to yield products having specific gravities progressively lower than .96.

9. The process of preparing Dipolymer from pipe oil which includes vaporizing pine oil and passing the vapors in intimate contact with fuller's earth for such length of time and at such temperature as will effect the polymerization of a substantial part of the pine oil vapors to form "Dipolymer."

10. The process of preparing "Dipolymer" from pine oil which includes vaporizing pine oil and passing the vapors in intimate contact with fuller's earth for such length of time and at such temperature as will effect dehydration and finally polymerization of a substantial part of the pine oil vapors to form "Dipolymer."

In testimony of which invention, I have hereunto set my hand at Philadelphia, Pennsylvania, on this 2nd day of July, 1926.

IRVIN W. HUMPHREY.